UNITED STATES PATENT OFFICE.

JOHN CARRINGTON SELLARS, OF BIRKENHEAD, ENGLAND.

IMPROVEMENT IN COMPOSITION FUEL FOR MANUFACTURE OF GAS.

Specification forming part of Letters Patent No. 133,894, dated December 10, 1872.

*To all whom it may concern:*

Be it known that I, JOHN CARRINGTON SELLARS, of Birkenhead, in the county of Chester, England, manufacturing chemist, have invented a certain improvement relating to Gas-Yielding Fuel, of which the following is a specification:

I produce a novel composition of matter to be used in place of coal, cannel, and like minerals in the manufacture of gas for illuminating and heating purposes; and it consists essentially in mixing sea-weed, sea-grass, and sea-wrack, (hereafter, for brevity, called sea-ware,) with one or more of the following substances, namely: Coal-tar, pitch, bitumen, and mineral oils, (either with or without peat,) peat, charcoal, or other carbonaceous matter. The mixed mass is subjected to destructive distillation in retorts.

The advantages secured by mixing sea-ware with the substances named are, first, insuring more effective separation of the light hydrocarbons; second, obtaining an increased yield of carbureted hydrogen; and, third, leaving a coke fit for use as fuel, but more particularly valuable in the manufacture of metal-founders' blacking.

In carrying my invention into practice, I mix sea-ware, preferably in the decomposed state, with peat-smalls, coal-tar or pitch, or bitumen or mineral oil, in the following proportions, by weight: Sea-ware, two parts; peat-smalls, one part; and coal tar or pitch, or bitumen or mineral oil, one and a half part. These are well mixed together, (edge-runners are suitable,) and formed into blocks, or used in the mass. Instead of the one part of peat-smalls mentioned above, one-eighth to one-fourth part of peat-charcoal or other dry carbonaceous matter may be used.

When it is desired to obtain part of the products in the form of liquid hydrocarbons and the remainder as gas, I prefer the following proportions, by weight: Sea-ware, four parts; peat-charcoal, one part; and coal-tar or pitch, or bitumen or mineral oil, two and one-half parts. The distillation would be commenced, in this instance, at a low temperature.

The proportions of the material may be varied, as will be evident, without departing from my invention.

The residue or coke left in the retort or retorts is suitable for use as fuel when withdrawn. When it is to be made into metal-founder's blacking it is ground between horizontal millstones or other suitable reducing appliances.

Having now described the nature of my said invention, and particularized the same in such manner that others will be enabled to carry my invention into practice, I claim—

1. The within-described compound for gas-fuel, consisting of sea-ware intimately mixed with coal-tar or analogous cementing material in about the proportions designated.

2. The combination of sea-ware, tarry matter, and peat or peat-charcoal ground together, as specified.

3. The within-described process for producing illuminating gas or oil and founders' blacking by grinding sea-ware with other matter and distilling, as set forth.

In testimony whereof I, the said JOHN CARRINGTON SELLARS, have hereunto set my hand the twenty-fifth day of September, A. D. 1872.

JOHN CARRINGTON SELLARS.

In the presence of—
J. P. KING,
JAMES JOHNSON.